(12) United States Patent
Matsumoto et al.

(10) Patent No.: US 7,422,242 B2
(45) Date of Patent: Sep. 9, 2008

(54) FILLER PIPE ARRANGING STRUCTURE FOR VEHICLE

(75) Inventors: Hideki Matsumoto, Saitama (JP); Naomasa Kaneko, Saitama (JP); Hiroto Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 10/557,033

(22) PCT Filed: Jun. 11, 2004

(86) PCT No.: PCT/JP2004/008589

§ 371 (c)(1), (2), (4) Date: Nov. 16, 2005

(87) PCT Pub. No.: WO2005/005190

PCT Pub. Date: Jun. 20, 2005

(65) Prior Publication Data

US 2006/0273571 A1    Dec. 7, 2006

(30) Foreign Application Priority Data

Jul. 11, 2003    (JP)    ............................. 2003-196096

(51) Int. Cl.
  *B60P 3/22*    (2006.01)
(52) U.S. Cl. .................................... 280/834
(58) Field of Classification Search ............. 280/830, 280/834
See application file for complete search history.

(56) References Cited

U.S. PATENT DOCUMENTS

| 4,469,339 | A | * | 9/1984 | Watanabe et al. | ........... 280/834 |
| 4,550,923 | A | * | 11/1985 | Ogawa et al. | ............... 280/834 |
| 5,195,780 | A | * | 3/1993 | Inoue et al. | .................. 280/834 |
| 5,201,547 | A | * | 4/1993 | Ogawa et al. | ............... 280/834 |
| 5,560,651 | A | | 10/1996 | Kami et al. | |
| 5,868,428 | A | | 2/1999 | Ishitaka | |
| 6,076,858 | A | * | 6/2000 | Funabashi | ................... 280/834 |
| 6,289,945 | B1 | | 9/2001 | Haboush | |
| 7,073,824 | B2 | * | 7/2006 | Uhara et al. | ................. 280/834 |

FOREIGN PATENT DOCUMENTS

JP      60-12746    4/1985
JP      2002-154461    5/2002

\* cited by examiner

*Primary Examiner*—Kevin Hurley
(74) *Attorney, Agent, or Firm*—Carrier, Blackman & Associates, P.C.; William D. Blackman; Joseph P. Carrier

(57) ABSTRACT

A filler pipe arrangement structure (20) includes left and right rear side frames (12, 13) extending longitudinally of a vehicle body, and a rear cross member (16) disposed in the vicinity of rear axles and extending crosswise between the rear side frames so as to reinforce the rear side frames. A filler pipe (31) connected at an upper end to a fueling port (33) of the vehicle body and having a lower end connected via a filler hose (32) to a fuel tank (18) is attached to a left front portion (24) of the left rear side frame located forwardly of the rear cross member.

20 Claims, 5 Drawing Sheets

FILLER PIPE ARRANGING STRUCTURE FOR VEHICLE

TECHNICAL FIELD

The present invention relates to a filler pipe arranging structure for arranging a filler pipe provided to guide a fuel from a fueling port of a vehicle into a fuel tank.

BACKGROUND ART

A filler pipe or hose connected to a fuel tank disposed below a vehicle floor for guiding a fuel to the fuel tank is known as disclosed in, for example, Japanese Utility Model Post-Exam Publication No. SHO-60-12746. The disclosed filler hose 102, as shown here in FIG. 5, has a lower portion 103 inserted in and connected to a fuel tank 101. A fueling port 104 is connected to an upper end of the filler hose 102 and mounted on a left side 106 of a vehicle body near a left rear wheel house 105. The filler hose 102 is arranged such that the lower portion 103 and an intermediate portion 107 extending upward from the lower portion 103 toward the fueling port 104 are disposed forwardly of a rear axle 108.

With this arrangement, when an impact force is applied to a rear end of the vehicle body in a forward direction, the rear axle 107 acts as a guard to protect the lower and intermediate filler hose portions 103 and 107 against damage or deformation which may otherwise occur due to the effect of the impact force. The disclosed filler pipe arranging structure has a drawback, however, that since the filler hose 102 is not fixed except at both ends thereof, an intermediate portion 107 of the hose may be damaged due to repeated striking engagement with neighboring vehicle parts or components occurring when the vehicle is traveling on a bumpy road or making sharp turns.

Some known vehicle body frame has an impact-absorbing portion at a rear end thereof. When subjected to a severe impact, the impact-absorbing rear end portion undergoes deformation or buckling to thereby absorb the impact force. When used with such vehicle body frame, a filler hose or pipe may be attached to the vehicle body frame at a position close to the deformable impact-absorbing rear end portion of the vehicle body frame. With this arrangement, when the vehicle body frame is subjected to a collision at a rear end thereof, the filler hose may undesirably deform due to the effect of an impact force applied thereto during deformation or buckling of the impact-absorbing portion of the vehicle body frame.

DISCLOSURE OF THE INVENTION

An object of the present invention is to provide a filler pipe arranging structure which is capable of stably holding a filler pipe without deformation or damage even when the vehicle body frame is subjected to an impact force at a rear part thereof.

According to the present invention, there is provided a filler pipe arranging structure for a vehicle having a vehicle body, a rear axle, a fuel tank, and a fueling port provided on one side of the vehicle body in the vicinity of a rear wheel house of the vehicle body, the pipe arranging structure comprising: left and right rear side frames extending longitudinally of the vehicle body and disposed leftward and rightward of the fuel tank, respectively; a rear cross member disposed in the vicinity of the rear axle and rearward of the fuel tank, the rear cross member extending crosswise between the left and right rear side frames for reinforcing the rear side frames, the rear side frames having front portions located forwardly of the rear cross member; and a filler pipe connected between the fuel tank and the fueling port and having an attachment portion attached to one of the front portions of the rear side frames.

By virtue of the cross member extending crosswise between the rear side frames, the front portions of the rear side frames have a rigidity sufficient to withstand severe impact forces such as ones experienced in a rear-end collision. Since the filler pipe is attached to one of such rigid front portions of the rear side frames, the filler pipe arranging structure can keep the filler pipe free from deformation even when rear ends of the rear side frames undergo an impact force. The cross member disposed rearward of the fuel tank acts to protect the fuel tank from the impact force.

The filler pipe arranging structure vehicle may further have a rear suspension spring and a rear suspension damper disposed rearward of the rear axle, and the filler pipe is spaced forward from the rear suspension damper and the rear suspension spring. With this arrangement, there is provided on the forward side of the rear axle a relatively large space available for installation of the filler pipe. By the large installation space thus provided, the degree of freedom in designing the filler pipe can be increased. Thus, the filler pipe can take such a simple form as to insure smooth flow of fuel from the fueling port to the fuel tank.

Preferably, the attachment portion of the filler pipe is located forwardly of the rear axle.

The filler pipe arranging structure may further comprise a front cross member extending crosswise between respective front ends of the rear side frames for reinforcing the rear side frames, in which instance there is a substantially rectangular space defined between the front and rear cross members and the front portions of the rear side frames. The fuel tank is received in the rectangular space with a peripheral wall thereof surrounded by the front and rear cross members and the front portions of the rear side frames. With this arrangement, the fuel tank is fully protected from any external force acting in longitudinal and transverse directions of the vehicle body.

It is preferable that the attachment portion of the filler pipe is located forwardly of the rear axle, and the rear cross member is disposed rearward of the rear axle. The rear cross member disposed rearward of the rear axle prevents transmission of an impact force from the rear ends of the rear side frames to the rear axle. Further, with the rear cross member disposed rearward of the rear axle, the space provided forwardly of the rear cross member for installation of the fuel tank is enlarged, and the capacity of the fuel tank can be increased correspondingly.

Preferably, the rear cross member is substantially U-shaped and has substantially the same height as the fuel tank. This arrangement is particular useful when the fuel tank has a larger height at a rear end than at a front end thereof. When viewed from a rear end of the vehicle body, the rear cross member substantially conceals a rear sidewall of the fuel tank. Thus, the rear sidewall of the fuel tank is fully protected by the rear cross member.

It is preferable that the front portions of the rear side frames have rigidity sufficient to withstand an impact force applied to rear ends of the rear side frames, and the rear side frames have rear portions located rearward of the rear cross member and deformable to absorb the impact force. When the rear ends of the rear side frames undergo an impact force, the rigid front portions do not deform while the rear portions deform to absorb the impact force. At this time, the filler pipe attached to the rigid front portion is kept free from deformation. The filler pipe can thus be kept in a normal deformation-free state at all times, which will insure smooth flow of fuel from the fueling port to the fuel tank.

BRIEF DESCRIPTION OF THE DRAWINGS

A certain preferred embodiment of the present invention will hereinafter be described in detail, by way of example only, with reference to the accompanying drawings, in which.

BEST MODE FOR CARRYING OUT THE INVENTION

Figure 1:
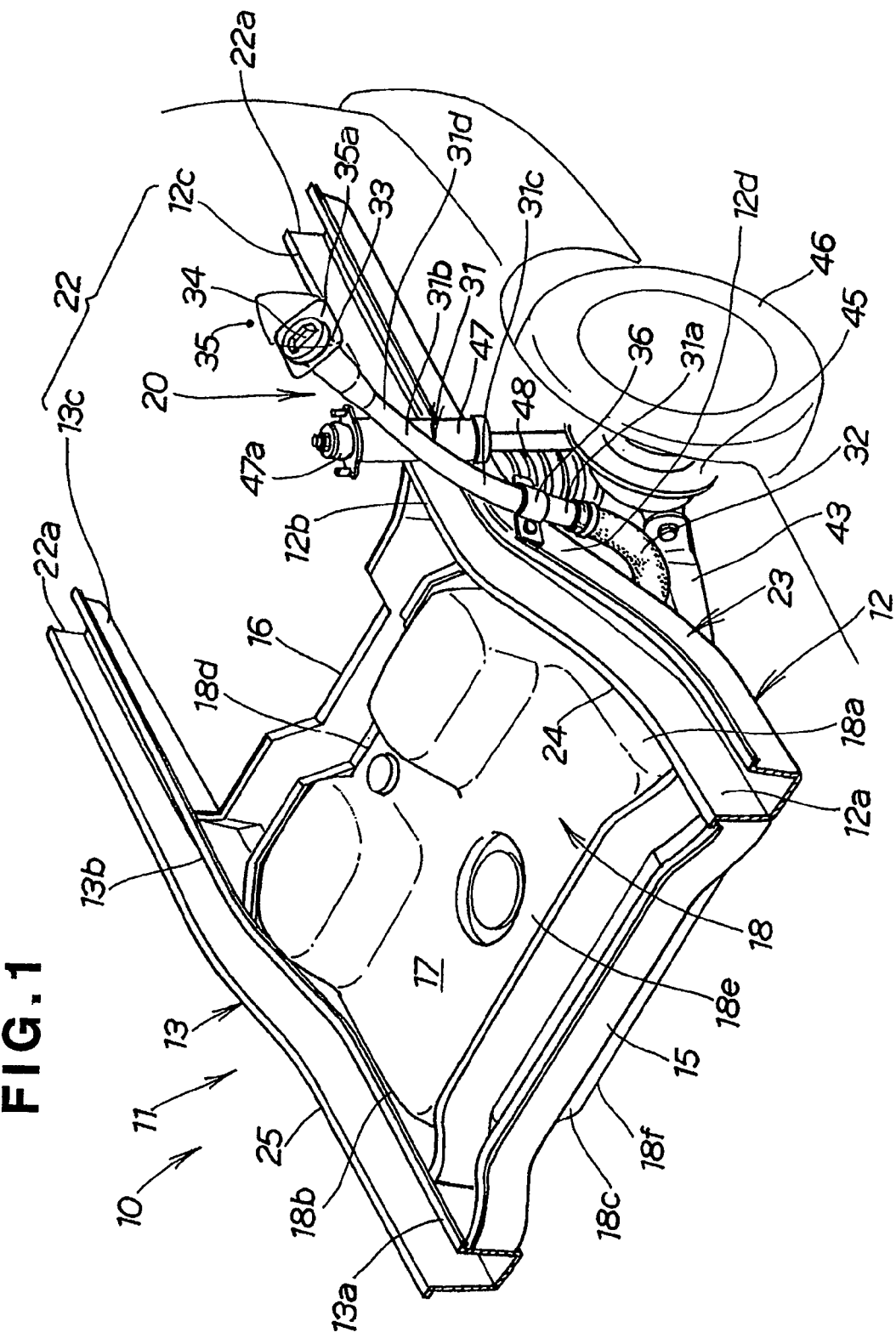
FIG. 1 is a perspective view of a rear part of a vehicle including a filler pipe arranging structure according to the present invention.

Referring to FIG. 1, a vehicle 10 includes a vehicle body frame 11 composed of left and right rear side frames 12, 13 extending in a longitudinal direction of a vehicle body (not designated) of the vehicle 10, a front cross member 15 extending crosswise between front ends 12a, 13a of the left and right rear side frames 12, 13 for reinforcing the rear side frames 12, 13, and a rear cross member 16 extending crosswise between substantially central portions 12b, 13b of the left and right rear side frames 12, 13 for reinforcing the left and right rear side frames 12, 13. The left and right rear side frames 12, 13 and the front and rear cross members 15, 16 jointly define a space 17 of substantially rectangular shape as viewed in top plan. The vehicle 10 also includes a fuel tank 18 received in the rectangular space 17.

By virtue of the rear cross member 16 extending crosswise between the left and right rear side frames 12, 13, the vehicle body frame 11 is formed with a rear part 22 located rearward of the rear cross member 16 and a front part 23 located forwardly of the rear cross member 16. The rear part 22 forms an impact-absorbing portion that is deformable to absorb an impact force applied to a rear end 22a of the rear part 22, while the front part 23 forms a highly rigid portion that is rigid enough to withstand the impact force without causing deformation or yielding. Stated more specifically, the rear part 22 of the vehicle body frame 11 is formed by respective rear portions 12c, 13c of the left and right rear side frames 12, 13 located rearward of the rear cross member 16, and the front part 23 of the vehicle body frame 11 is formed by respective front portions 24 and 25 of the left and right rear side frames 12, 13 located forward of the rear cross member 16.

A filler pipe 31 is connected at one end (lower end) thereof to a filler hose 32. The filler pipe 31 has an upper end connected to a fueling port 33 formed in a recessed filling base 35a on a left side 35 of the vehicle body in the vicinity of a left rear wheel house 26 (FIG. 2) of the vehicle body. The fueling port 33 is normally closed by a cap 34. The filler pipe 31 is attached by a mounting bracket 36 to the front portion 24 of the left rear side frame 12 at a position located forwardly of the rear cross member 16.

The filler pipe 31 has a lower end portion (an attachment portion) 31a extending to below the left rear side frame 12. The lower end portion 31a is attached by the mounting bracket 36 to the left front portion 24, more specifically, to an outer sidewall 12d of the left front portion 24 of the left rear side frame 12 in the vicinity of the central portion 12b of the left rear side frame 12.

Figure 2:
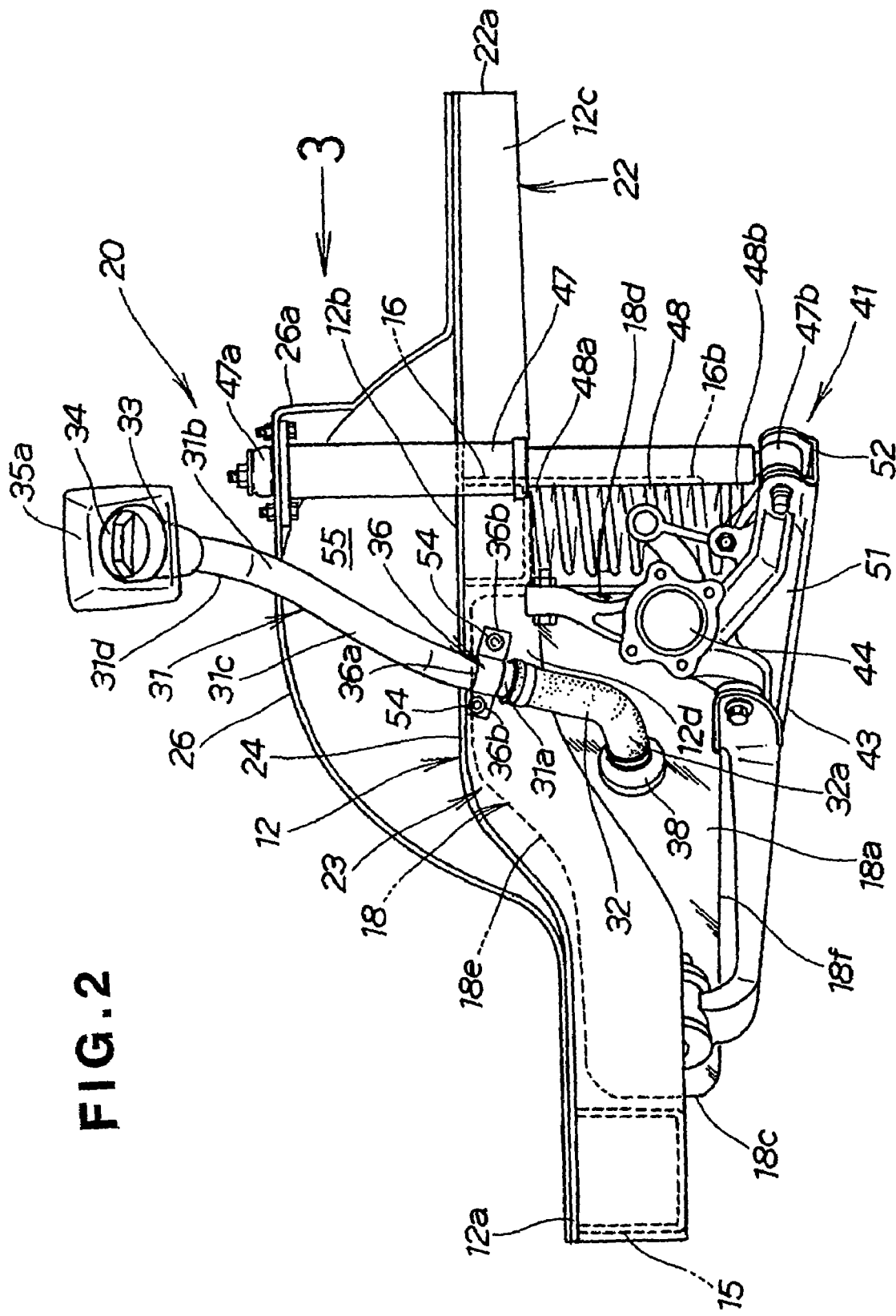
FIG. 2 is a side elevation view of FIG. 1.

The filler hose 32 has an upper end thereof connected to the lower end portion 31a of the filler pipe 31. The filler hose 32 has a lower end portion 32a inserted into the fuel tank 18 through a left sidewall 18a thereof. The lower end portion 32a of the filler hose 32 is connected to the left sidewall 18a of the fuel tank 18 by means of an attachment member 38 (FIG. 2).

The left and right rear side frames 12, 13, the front and rear cross members 15, 16, the filler pipe 31 and the filler hose 32 constitute essential parts of a filler pipe arranging structure 20 according to the present invention.

Figure 3:
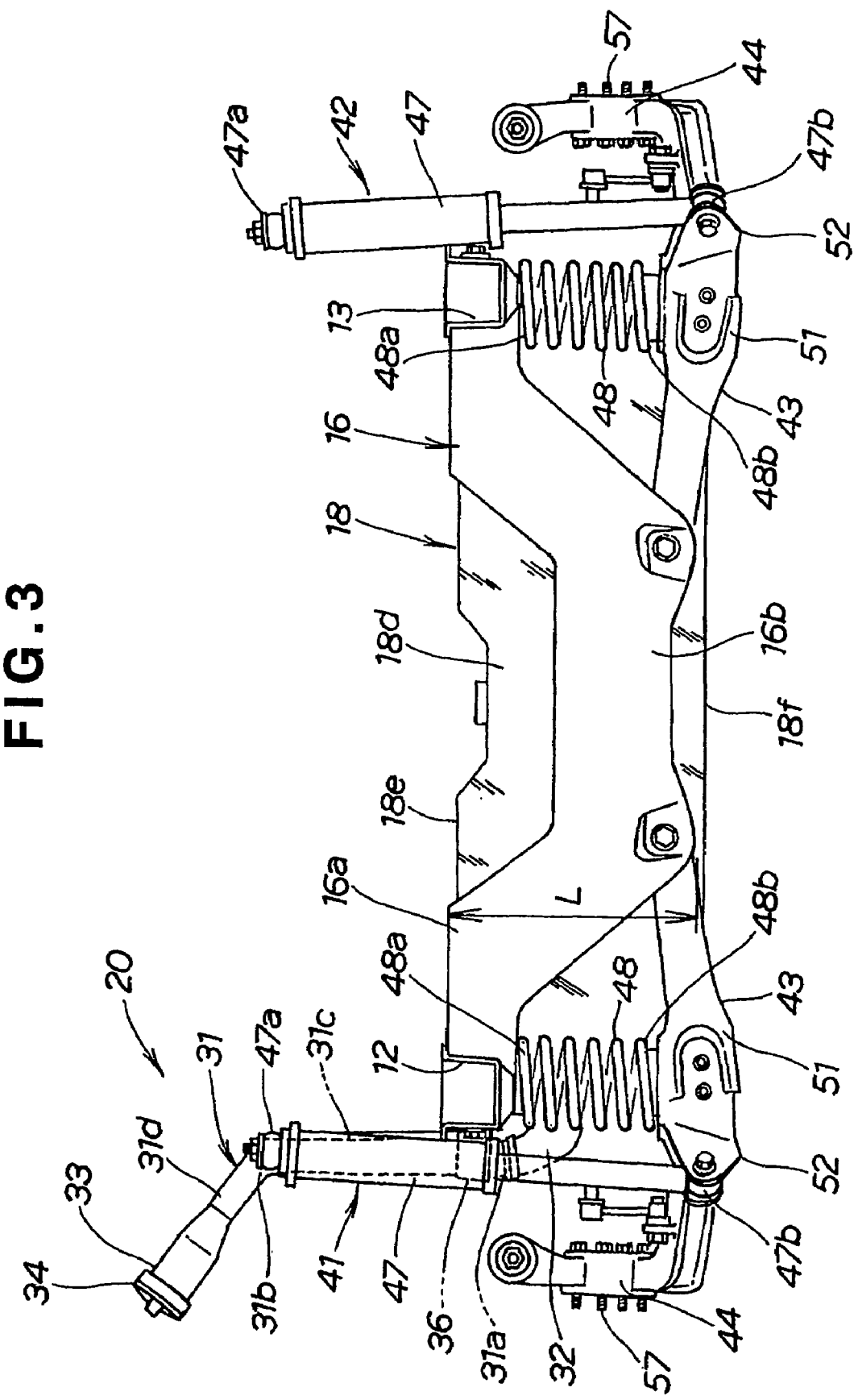
FIG. 3 is an elevational view as seen in a direction of arrow 3 of FIG. 2.

As best shown in FIG. 3, the filler pipe 31 is bent at its central portion 31b into a dogleg configuration and includes a lower part 31c disposed below the central portion 31b and an upper part 31d disposed above the central portion 31b. The upper part 31d extends obliquely downward from the upper end of the filler pipe 31 in a lateral inward direction of the vehicle body. The lower part 31c extends substantially vertically and downwardly from the central portion 31b and ends in the lower end portion 31a of the filler pipe 31. As shown in FIG. 2, the lower part 31c of the filler pipe 31 is slightly rearward inclined when viewed from a side of the vehicle. The filler pipe 31 of the foregoing configuration can smoothly guide a fuel from the fueling port 33 to an extreme end of the lower end portion 31a of the filler pipe 31.

As discussed previously, the upper end of the filler hose 32 is connected to the lower end portion 31a of the filler pipe 31 and the lower end portion of the filler hose 32 is connected to the left sidewall 18a of the fuel tank 18. As shown in FIG. 2, the filler hose 32 extends from the lower end portion 31c of the filler pipe 31 to an area below the left rear side frame 12, and attaches to the fuel tank 18 via the attachment member 38. When connected with the filler pipe 31 and the fuel tank 18, the filler hose 32 assumes a gently bent or curved configuration, so that the fuel introduced from the lower end portion 31a of the filler pipe 31 into the filler hose 32 is smoothly guided by the gently curved filler hose 32 into the fuel tank 18.

It may be appreciated that a fuel supply line formed jointly by the generally dogleg-shaped filler pipe 31 and the gently curved filler hose 32 insures extremely smooth delivery of the fuel from the fueling port 33 to the fuel tank 18.

When the fuel tank 18 is to be supplied with a fuel, a filler door or lid (not shown) associated with the recessed filler base 35a (FIGS. 1 and 2) is opened to expose the recessed filler base 35a, and the cap 34 is detached from the fueling port 33 to open the fueling port 33. Fuel is then supplied into the fueling port 33. The thus supplied fuel is smoothly guided into the fuel tank 18 through the filler pipe 31 and the filler hose 32.

The left rear side frame 12 has a substantially U-shaped cross-section and extends in a front-and-rear direction (longitudinal direction) of the vehicle body. The vehicle 10 has a left rear axle 44 (FIGS. 2 and 3) mounted to the left rear side frame 12 via a link unit 43 of a left rear suspension 41. A left brake disc 45 and a left rear wheel 46 are mounted on the left rear axle 44. The left rear suspension 41 includes a damper 47 and a coil spring 48 as will be explained later.

The right rear side frame 13 is disposed in parallel to the left rear side frame 12 with a predetermined interval set therebetween. Like the left rear side frame 12, the right rear side frame 13 has a substantially U-shaped cross-section and extends in the longitudinal or front-and-rear direction of the vehicle body. As shown in FIG. 3, a right rear axle 44 is attached to the right rear side frame 13 via a right rear suspension 42. The right rear suspension 42 is identical in construction to the left rear suspension 41, and hence components of the right rear suspension 42 are designated by the same numerals as those of the left rear suspension 41 and further explanation thereof will be omitted.

The front cross member 15 is a reinforcing member having a substantially U-shaped cross-section. Similarly, the rear cross member 16 is a reinforcing member having a substantially U-shaped cross-section.

The front cross member 15 is connected at opposite ends to the respective front ends 12a, 13a of the left and right rear side frames 12, 13. The front cross member 15 has an I-shaped configuration when viewed from a front end of the vehicle body frame 11.

The rear cross member 16 is connected at opposite ends to the respective central portions 12b, 13b of the left and right rear side frames 12, 13 in the vicinity of the rear axles 44 (FIG. 2). The rear cross member 16 in the illustrated embodiment is disposed rearward of the rear axles 44, as shown in FIG. 2. Furthermore, as shown in FIG. 3, the rear cross member 16 has a generally U-shaped configuration as viewed in rear end elevation and includes an upper surface 16a lying substantially in flush with upper surfaces of the left and right rear side frame 12, 13 and a downwardly projecting central portion 16b extending downward to the extent that the height L of the U-shaped rear cross member 16 is substantially equal to a height of the fuel tank 18 measured at a rear end thereof. The left and right rear suspensions 41, 42 each have a lower link 51 pivotally connected to a bottom part of the downwardly projecting central portion 16b of the U-shaped rear cross member 16.

The fuel tank 18 is received in the substantially rectangular space 17 jointly defined by the front and rear cross members 15, 16 and the front portions 24, 25 of the rear side frames 12, 13 of the vehicle body frame 11. The fuel tank 18 has left and right sidewalls 18a, 18b extending alongside the respective front portions 24, 25 of the left and right rear side frames 12, 13, and front and rear sidewalls 18c, 18d extending alongside the front and rear cross members 15, 16, respectively. These four sidewalls 18a to 18d form a peripheral wall of the fuel tank 18, which defines a substantially rectangular shape as viewed in top plan. A top wall 18e of the fuel tank 18 is profiled to lie substantially flush with or slightly below respective upper surfaces of the front and rear cross members 15, 16 and the front portions 24, 25 of the left and right rear side frames 12, 13. A bottom wall 18f of the fuel tank 18 is disposed to lie at a slightly higher level than lowermost portions 52, 52 of the link units 43, 43 of the left and right rear suspensions 41, 42 (FIG. 2 and FIG. 3).

With the fuel tank 18 thus arranged, the peripheral wall of the fuel tank 18 is surrounded by a rectangular frame part of the vehicle frame body 11 that is formed by the front portions 24, 25 of the left and right rear side frames 12, 13 and the front and rear cross members 15, 16. Since the front side frame portions 24, 25 form the highly rigid front part 23 of the vehicle body frame 11 and since the cross members 15, 16 act as reinforcing members, the fuel tank 18 is fully protected against external forces acting in the longitudinal and transverse directions of the vehicle body.

Reference is next made to FIG. 2. For the purpose of clarity, the left brake disc 45 and the left rear wheel 46 are omitted from FIG. 2.

The damper 47 of the left rear suspension 41 has an upper end 47a connected to a mounting portion 26a of the left rear wheel house 26 and a lower end 47b connected to the left lower link 51 of the link unit 43. The coil spring 48 has an upper end 48a attached to a bottom wall of the central portion 12b of the left rear side frame 12 and a lower end 48b attached to the rear lower link 51. The damper 47 and the coil spring 48 also form a part of the filler pipe arranging structure 20.

The filler hose 33 and the lower end portion 31a of the filler pipe 30 are disposed in the vicinity of the left rear axle 44. The rear cross member 16 is disposed in the vicinity of the left and right rear axles 44, 44. More specifically, the rear cross member 16 is disposed rearward of the rear axles 44 to prevent the rear axles 44, 44 from being affected by an impact force applied to the rear ends 22a of the rear part 22 of the vehicle body frame 11 in the forward direction of the vehicle body as well as to allow the fuel tank to have its large capacity. At least the filler hose 32 and the lower end portion 31a of the filler pipe 31 are disposed forwardly of the left rear axle 44. The lower end portion 31a of the filler pipe 31 is attached by the mounting bracket 36 to the highly rigid front part 23 of the vehicle body frame 11 (FIG. 1), more specifically, to the outer sidewall 12d of the highly rigid front portion 24 of the left rear side frame 12 at a position close to the rear cross member 16.

The mounting bracket 36 is formed from a narrow strip of metal having a central portion 36a bent into a U-shaped configuration and flat opposite end portions 36b, 36b extending contiguously from opposite ends of the U-shaped central portion 36a. For attachment of the filler pipe 31 to the left rear side frame 12, the opposite flat end portions 36b, 36b of the mounting bracket 36 are held in abutment with the outer sidewall 12d of the front portion 24 of the left rear side frame 12 with the lower end portion 31a of the filler pipe 31 held or received in the U-shaped central portion 36a. While keeping this condition, the opposite end portions 36b, 36b are secured by a pair of bolts 54 to the outer wall 12d of the left rear side frame 12. The lower end portion 31a of the filler pipe 31 is thus attached to the highly rigid front portion 24 of the left rear side frame 12 at a position near the rear cross member 16.

The damper 47 and the coil spring 48 of the left rear suspension 41 are disposed rearward of the left rear axle 44. The filler pipe 31 and the filler hose 32 are spaced forward away from the damper 47 and the spring 48. Accordingly, there is provided on the forward side of the left rear axle 44 a relatively large space 55 available for installation of the filler pipe 31 and the filler hose 32. By thus providing the large installation space 55, it is possible to increase the degree of freedom in designing the filler pipe 31 and hose 32 to the extent that the filler pipe 31 and hose 32 take a simple form, such as a dogleg shape or a gently curved configuration, which will allow the fuel supplied to the fueling port 33 to flow smoothly through the filler pipe 31 and hose 32 and enter the fuel tank 18.

Conversely, if the damper 47 and the coil spring 48 of the left rear suspension 41 were disposed near the filler pipe 31 and the filler hose 32, there would be only a relatively small space available for installation of the filler pipe 31 and the filler hose 32. Thus, the filler pipe 31 and the filler hose 32 should take a complicated configuration including acute bends so as to avoid interference with the damper 47 and the coil spring 48. Due to such complicated configuration, the filler pipe 31 and the filler hose 32 cannot insure smooth flow of the fuel from the fueling port 33 to the fuel tank 18.

Reference is next made to FIG. 3. As shown in this figure, the coil spring 48 of the left rear suspension 41 is connected at opposite ends to the left rear side frame 12 and the left lower link 51. The damper 47 is connected at opposite ends to the mounting portion 26a (FIG. 2) of the left rear wheel house 26 and the left lower link 51. The left rear axle 44 is supported by the left lower link 51, and the brake disk 45 (FIG. 1) is secured by stud bolts 57 to the left rear axle 44. The left rear wheel 44 (FIG. 1) is mounted to the brake disk 45.

The rear cross member 16 of generally U-shaped configuration is disposed between the coil springs 48, 48 of the left and right rear suspensions 41, 42. As discussed previously, the height L of the rear cross member 16 is substantially equal to the height of the fuel tank 18 measured at the rear end of the fuel tank 18 (namely, the height of the rear sidewall 18d of the fuel tank 18). The upper surface 16a of the rear cross member 17 lies at substantially the same level as an upper end of the rear wall 18d of the fuel tank 18, and a bottom wall (not designated) of the rear cross member 17 is disposed to lie at substantially the same level as a lower end of the rear sidewall 18d of the fuel tank 18. Thus, the rear sidewall 18d of the fuel tank 18 is substantially concealed by the rear cross member 16. This arrangement achieves fully effective protection of the fuel tank 18 against forces acting in a forward direction of the vehicle body.

Operation of the filler pipe arranging structure 20 will be discussed with reference to FIGS. 4A and 4B.

Figure 4A:
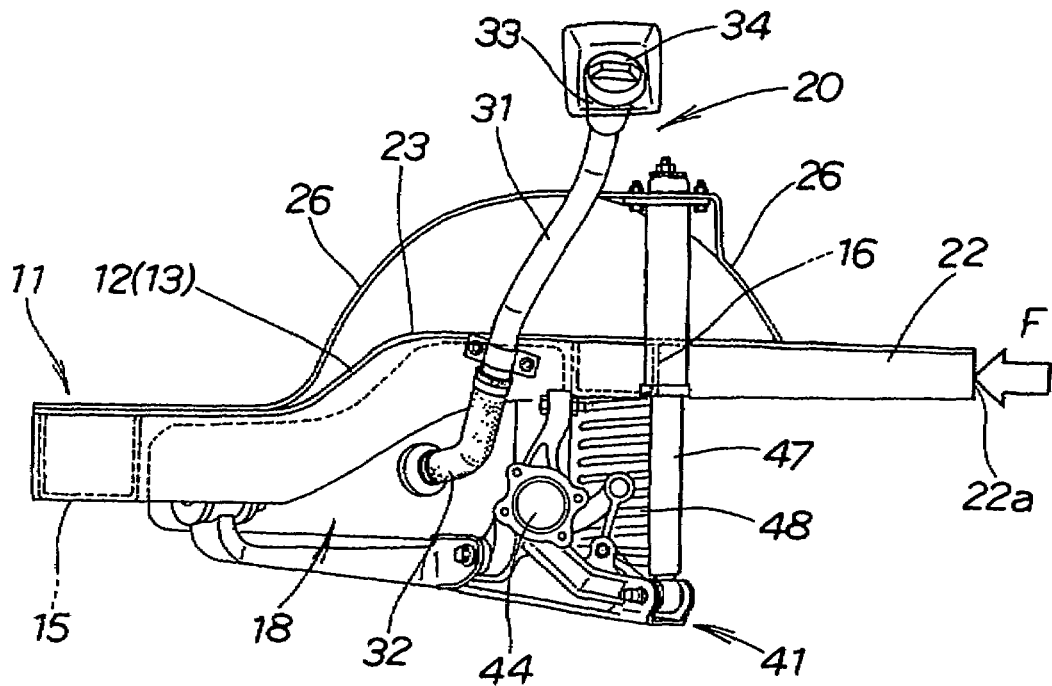
FIG. 4A is side elevation view illustrative of the condition of the filler pipe arranging structure when an impact force is applied to a rear end of a vehicle body frame.
Figure 4B:
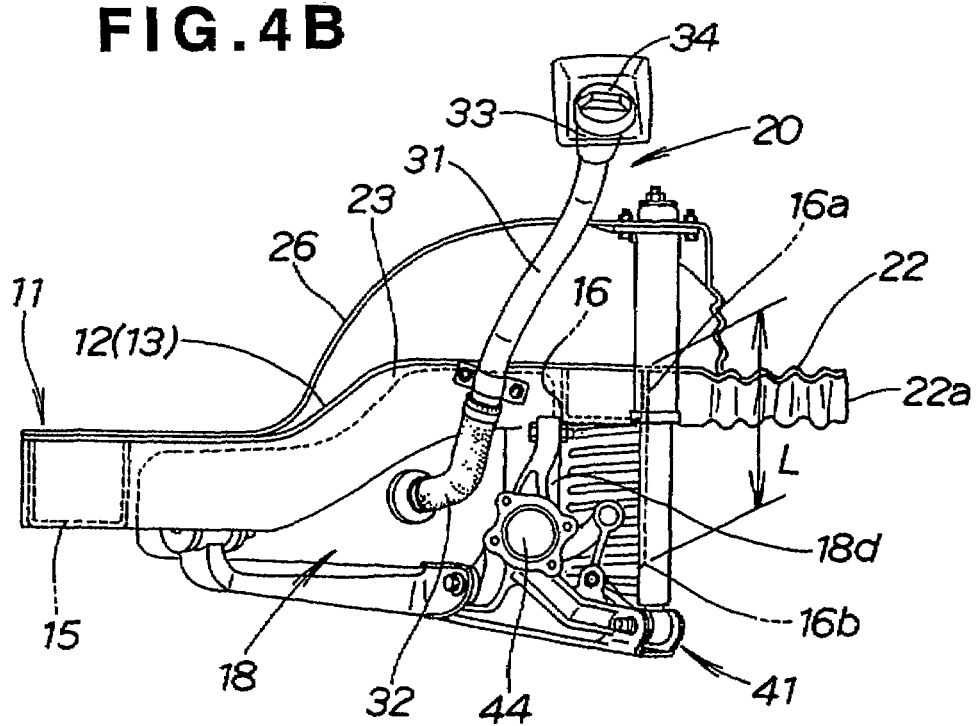
FIG. 4B is a view similar to FIG. 4A, but showing the condition of the filler pipe arranging structure when a rear part of the vehicle body frame acting as an impact-absorbing portion deforms or buckles to thereby absorb the impact force.
Figure 5:
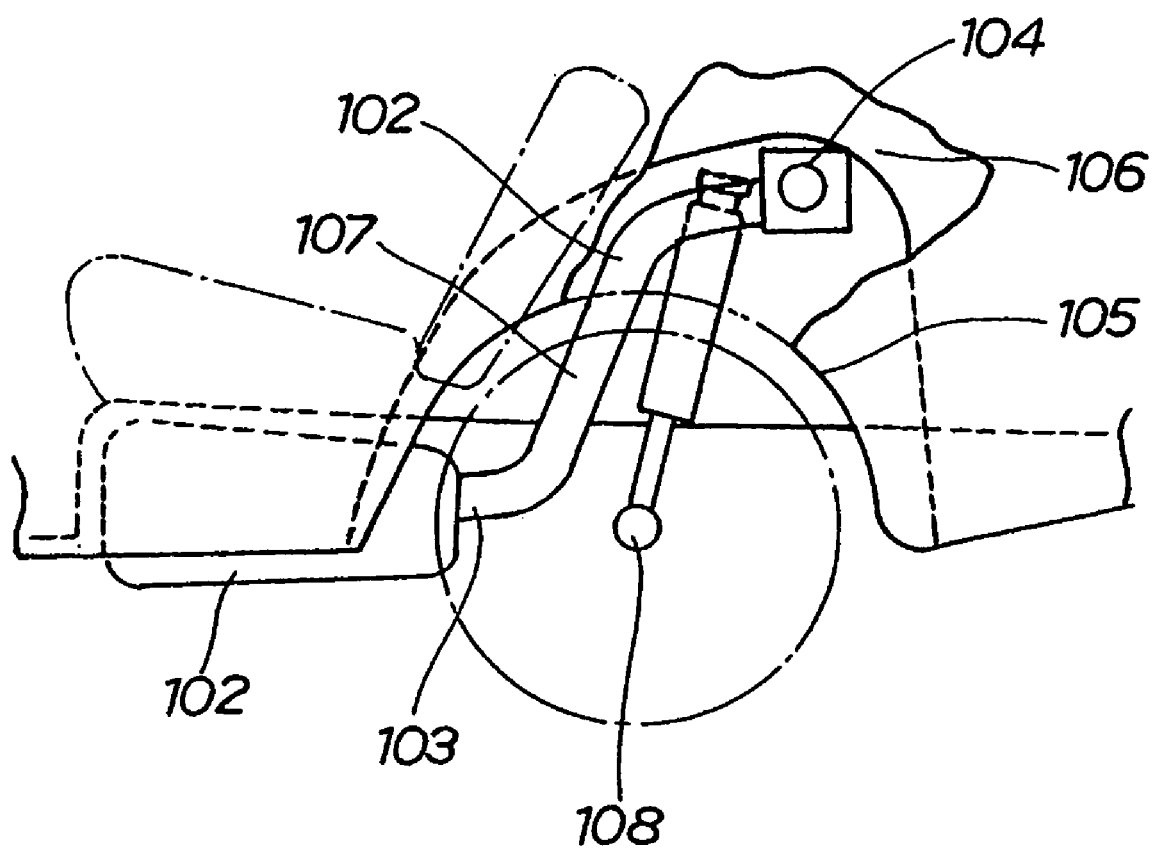
FIG. 5 is a side elevation view of a conventional filler pipe arrangement structure.

When an impact force F directed forwardly of the vehicle body is applied to the rear end 22a of the rear part 22 of the vehicle body frame 11, as shown in FIG. 4A, the rear part 22 (impact-absorbing portion) of the vehicle body frame 11 deforms or buckles to absorb the impact force F, as shown in FIG. 4B. In this instance, the front part 23 (highly rigid portion) of the vehicle body frame 11 does not undergo deformation because of its rigidity which is high enough to withstand the impact force F. Since the filler pipe 31 is attached to the highly rigid front part 23 free from deformation, it is possible to keep the filler pipe 31 in a normal deformation-free state where the fuel can smoothly flow from the fueling port 33 to the filler hose 32.

Furthermore, the fuel tank 18 is also kept free from deformation because the peripheral wall of the fuel tank 18 is surrounded by the highly rigid front part 23 and the front and rear cross members 15, 16 of the vehicle body frame 11. Additionally, since the rear cross member 16 is disposed rearward of the rear axles 44, transmission of the impact force F from the rear part 22 to the rear axles 44 is effectively blocked by the rear cross member 16.

Although the filler pipe 31 is attached to the left rear side frame 12 in the illustrated embodiment, it is possible according to the invention to attach the filler pipe 31 to the right rear side frame 13 in the same manner.

It will be appreciated that, in place of the attachment bracket 36, another type of attachment member may be employed to attach the filler pipe 31 to the front part 23 of the vehicle body frame 11.

The filler hose 32 may be omitted in which instance the filler pipe 31 is used alone to guide a fuel from the fueling port 33 to the fuel tank 18. As an alternative, the filler pipe 31 may be omitted. In this case, the filler hose 32 alone is used to guide the fuel from the fueling port 33 to the fuel tank 18.

It will be appreciated that the arrangements of the damper 48 and coil spring 47 of each rear suspension are not limited to ones as discussed hereinabove as long as they are disposed rearward of the axles and spaced rearward away from the filler pipe and the filler hose.

INDUSTRIAL APPLICABILITY

As explained above, the filler pipe is attached to the highly rigid front portion of the left rear side frame disposed forwardly of the rear cross member. The front portion is rigid enough to stand up to severe impacts, thereby protecting the filler pipe from deformation even when an impact force is applied to the rear ends of the rear side frames. The filler pipe arranging structure including the thus attached filler pipe is useful for a vehicle.

The invention claimed is:

1. A filler pipe arranging structure for a vehicle having a vehicle body, a rear axle, a fuel tank, and a fueling port provided on one side of the vehicle body in a vicinity of a rear wheel house of the vehicle body, the filler pipe arranging structure comprising:
    left and right rear side frames extending longitudinally of the vehicle body and disposed leftward and rightward of the fuel tank, respectively,
    a rear cross member disposed in a vicinity of the rear axle and rearward of the fuel tank, the rear cross member extending crosswise between the left and right rear side frames for reinforcing the rear side frames, the rear side frames having front portions located forwardly of the rear cross member;
    a fuel hose operatively attached to the fuel tank for providing fuel thereto, a portion of the fuel hose extending below one of the rear side frames; and
    a filler pipe connected between the fuel hose and the fueling port and having an attachment portion attached to one of the front portions of the rear side frames.

2. The filler pipe arranging structure of claim 1, further comprising a rear suspension spring and a rear suspension damper disposed rearward of the rear axle, wherein the fuel tank is disposed forward of the rear suspension damper, and wherein the filler pipe is spaced forward from the rear suspension damper and the rear suspension spring.

3. The filler pipe arranging structure of claim 2, wherein the attachment portion of the filler pipe is located forwardly of the rear axle.

4. The filler pipe arranging structure of claim 1, further comprising a front cross member extending crosswise between respective front ends of the rear side frames for reinforcing the rear side frames, there being a substantially rectangular space defined between the front and rear cross members and the front portions of the rear side frames, the fuel tank being disposed in the rectangular space with a peripheral wall thereof surrounded by the front and rear cross members and the front portions of the rear side frames.

5. A filler pipe arranging structure of claim 1, wherein the attachment portion of the filler pipe is located forwardly of the rear axle, and the rear cross member is disposed rearward of the rear axle.

6. The filler pipe arranging structure of claim 1, wherein the rear cross member is substantially U-shaped and is disposed at substantially the same height as an upper portion of the fuel tank.

7. The filler pipe arranging structure of claim 1, wherein the front portions of the rear side frames have a rigidity sufficient to withstand an impact force applied to rear ends of the rear side frames, and the rear side frames have rear portions disposed rearward of the rear cross member and deformable to absorb the impact force applied to the rear ends of the rear side frames.

8. The filler pipe arranging structure of claim 4, wherein each of the front and rear cross members is configured with a substantially U-shaped cross section.

9. A filler pipe arranging structure for a vehicle having a vehicle body, a rear axle, left and right rear suspension dampers, a fuel tank, and a fueling port provided on one side of the vehicle body in a vicinity of a rear wheel house of the vehicle body, the filler pipe arranging structure comprising:

left and right rear side frames extending longitudinally of the vehicle body and disposed leftward and rightward of the fuel tank, respectively;

a rear cross member disposed in a vicinity of the rear axle and rearward of the fuel tank, the rear cross member extending crosswise between the left and right rear side frames for reinforcing the rear side frames, the rear side frames having front portions located forwardly of the rear cross member; and a filler pipe connected between the fuel tank and the fueling port and having an attachment portion attached to one of the front portions of the rear side frames;

wherein the fuel tank is disposed forward of the rear suspension dampers.

10. The filler pipe arranging structure of claim 9, further comprising rear suspension springs respectively surrounding the rear suspension dampers and disposed rearward of the rear axle, wherein the fuel tank is disposed forward of the rear suspension dampers, and wherein the filler pipe is spaced forward from the rear suspension dampers and the rear suspension springs.

11. The filler pipe arranging structure of claim 10, wherein the attachment portion of the filler pipe is located forwardly of the rear axle.

12. A filler pipe arranging structure of claim 9, wherein the attachment portion of the filler pipe is located forwardly of the rear axle, and the rear cross member is disposed rearward of the rear axle.

13. The filler pipe arranging structure of claim 9, wherein the rear cross member is substantially U-shaped and has substantially the same height as the fuel tank.

14. The filler pipe arranging structure of claim 9, wherein the front portions of the rear side frames have a rigidity sufficient to withstand an impact force applied to rear ends of the rear side frames, and the rear side frames have rear portions disposed rearward of the rear cross member and deformable to absorb the impact force applied to the rear ends of the rear side frames.

15. A filler pipe arranging structure for a vehicle having a vehicle body, a rear axle, a fuel tank, and a fueling port provided on one side of the vehicle body in a vicinity of a rear wheel house of the vehicle body, the filler pipe arranging structure comprising:

left and right rear side frames extending longitudinally of the vehicle body and disposed leftward and rightward of the fuel tank, respectively, wherein each of the left and right rear side frames is configured with a substantially U-shaped cross section;

a front cross member extending crosswise between respective front ends of the rear side frames for reinforcing the rear side frames;

a rear cross member disposed behind the front cross member in a vicinity of the rear axle and rearward of the fuel tank, the rear cross member extending crosswise between the left and right rear side frames for reinforcing the rear side frames, the rear side frames having front portions located forwardly of the rear cross member, the front and rear cross members and the left and right rear side frames cooperating to form a cage which receives and closely surrounds the fuel tank, there being a substantially rectangular space defined within the cage and between the front and rear cross members and the front portions of the rear side frames, wherein each of the front and rear cross members is configured with a substantially U-shaped cross section;

the fuel tank being disposed in the rectangular space with a peripheral wall thereof surrounded by the front and rear cross members and the front portions of the rear side frames; and a filler pipe connected between the fuel tank and the fueling port and having an attachment portion attached to one of the front portions of the rear side frames.

16. The filler pipe arranging structure of claim 15, further comprising a rear suspension spring and a rear suspension damper disposed rearward of the rear axle, wherein the fuel tank is disposed forward of the rear suspension damper, and wherein the filler pipe is spaced forward from the rear suspension damper and the rear suspension spring.

17. The filler pipe arranging structure of claim 16, wherein the attachment portion of the filler pipe is located forwardly of the rear axle.

18. The filler pipe arranging structure of claim 15, wherein the attachment portion of the filler pipe is located forwardly of the rear axle, and the rear cross member is disposed rearward of the rear axle.

19. The filler pipe arranging structure of claim 15, wherein the rear cross member has substantially the same height as the fuel tank.

20. The filler pipe arranging structure of claim 15, wherein the front portions of the rear side frames have a rigidity sufficient to withstand an impact force applied to rear ends of the rear side frames, and the rear side frames have rear portions disposed rearward of the rear cross member and deformable to absorb the impact force applied to the rear ends of the rear side frames.

* * * * *